Figure 1:
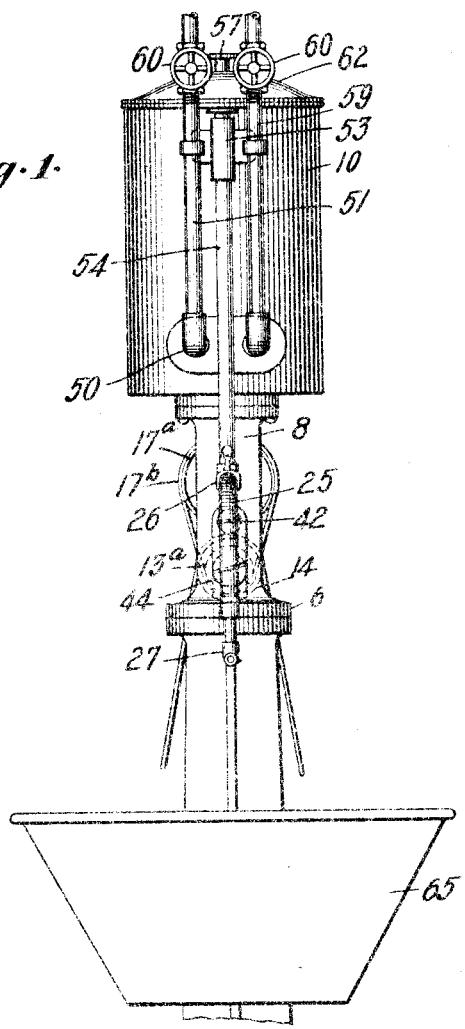
Figure 1:
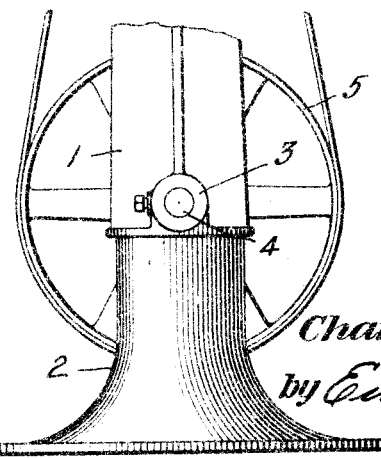

C. P. STANBON.
WORK MOISTENING MACHINE.
APPLICATION FILED SEPT. 17, 1908.

1,057,099.

Patented Mar. 25, 1913.
2 SHEETS—SHEET 1.

Witnesses:
Walter L. Price
Robert H. Kammler

Inventor:
Charles P. Stanbon,
by Cenny & Porth
Attys.

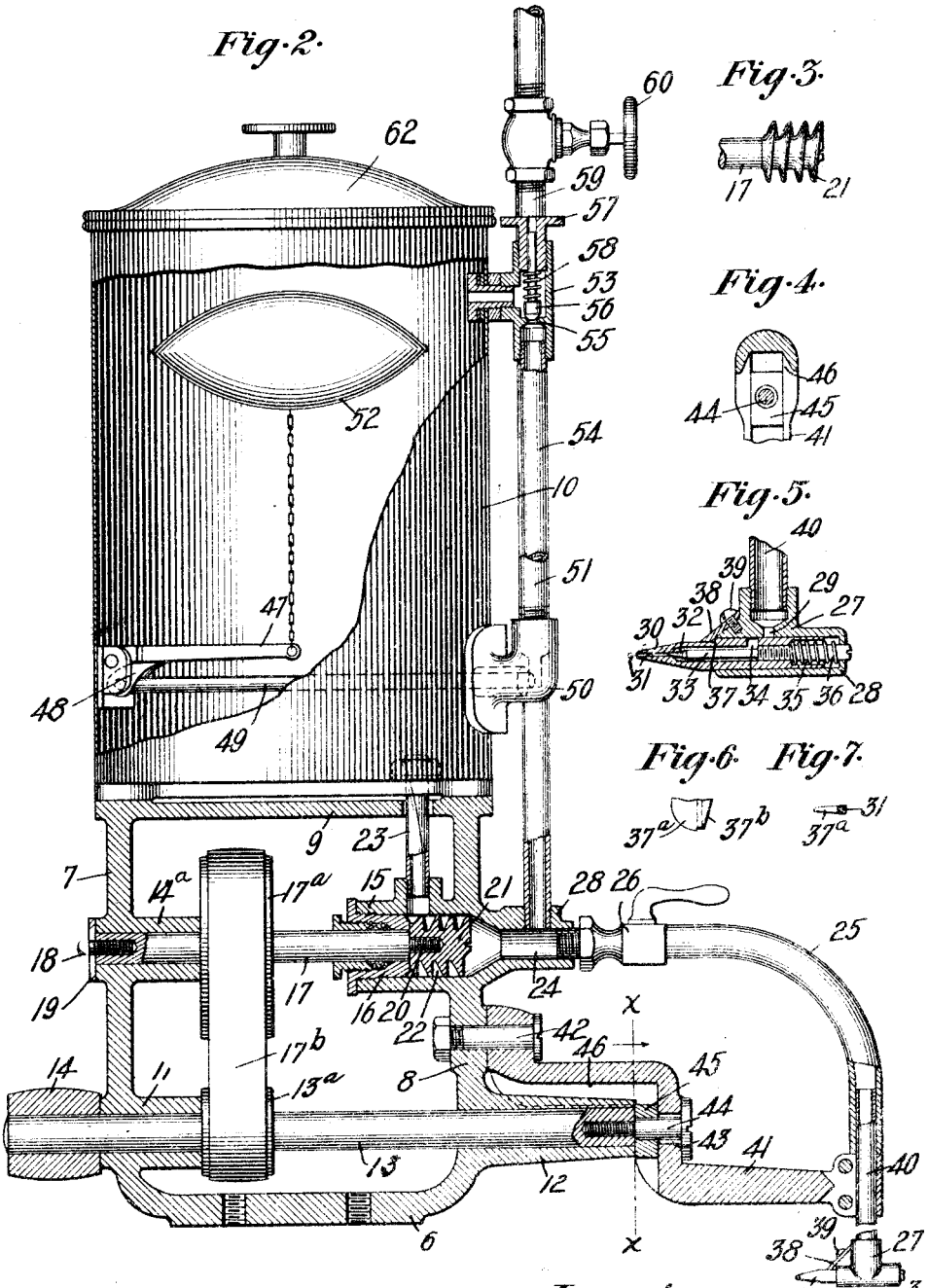

UNITED STATES PATENT OFFICE.

CHARLES P. STANBON, OF LYNN, MASSACHUSETTS, ASSIGNOR TO UNITED SHOE MACHINERY COMPANY, OF PATERSON, NEW JERSEY, A CORPORATION OF NEW JERSEY.

WORK-MOISTENING MACHINE.

1,057,099.        Specification of Letters Patent.      Patented Mar. 25, 1913.

Application filed September 17, 1908. Serial No. 453,401.

*To all whom it may concern:*

Be it known that I, CHARLES P. STANBON, a citizen of the United States, residing at Lynn, in the county of Essex, Commonwealth of Massachusetts, have invented an Improvement in Work-Moistening Machines, of which the following description, in connection with the accompanying drawings, is a specification, like letters on the drawing representing like parts.

My invention relates to machines for moistening materials, especially such as are of a fibrous nature, for example, leather, to soften the same and render it pliable and easy to work.

My invention is particularly adapted to the purpose of moistening the channel, lip and between substance or any of them of a shoe sole, during the operation of making the shoe.

In the drawings illustrating the preferred form of my invention selected for description herein,—Figure 1 is a front elevation; Fig. 2, a side elevation facing the operator; Fig. 3, an enlarged detail showing the feed worm partly broken away; Fig. 4, an enlarged sectional detail on the line $x$—$x$, Fig. 2; Fig. 5, an enlarged sectional detail of the head moistening nozzle and controlling valve; and, Figs. 6 and 7, plan and end views respectively, of the moistening nozzle.

Referring first to Fig. 1, the machine shown comprises a post 1, erected upon a suitable base 2, and having bearings 3 for the suitably driven shaft 4 carrying the pulley 5 to be referred to. Upon the post is mounted in any desired manner a head 6 (Figs. 1 and 2) provided with uprights 7 and 8 connected at their upper ends by a plate 9. The plate 9 carries the water reservoir 10. The uprights 7 and 8 near their lower ends are provided respectively with bosses 11 and 12, which provide bearings for the shaft 13 carrying the pulley 13ᵃ and at one end a pulley 14 belted as indicated to and driven by the pulley 5 heretofore referred to, on the bottom shaft 4. Above the shaft 13, said uprights are also provided with bosses 14ᵃ and 15, the latter containing the stuffing box 16, in which is journaled the shaft 17 carrying the pulley 17ᵃ connected by belt 17ᵇ to the pulley 13ᵃ. One end of the shaft 17 is tapped to receive the screw 18 by means of which the washer 19 is secured to said shaft to prevent endwise motion thereof. The opposite or front end of the shaft 17 is reduced at 20 to receive thereon the feed worm 21, which is contained in a chamber 22 in the boss 15, said chamber communicating by the pipe 23 with the water reservoir 10 referred to. Said chamber 22 in provided with a delivery passage 24 communicating with a downwardly bent flexible pipe 25, which leads to the wetting head 27, a valve 26 in said flexible pipe furnishing means for regulating the flow of water therethrough. The wetting head 27 contains a chamber 28 which communicates with the pipe 25 by means of a port 29, said chamber being open at its inner end to receive the moistening nozzle and valve 30. The nozzle and valve is provided with a longitudinal delivery passage 31, enlarged at 32 to receive the valve 33 adjustably mounted in the nozzle 30 which has a port 34. This coöperates with said port 29 in the valve head to regulate the flow of water to said nozzle. Said valve is extended rearwardly and through the end of the chamber 28 to enable it to be turned for adjusting the valve relative to its said carrier. The inner end of the nozzle 30 is recessed at 35 to receive a spring 36 surrounding the valve 33 and seated against the end of said chamber 28, said spring tending to keep the valve 33 normally in its forward position and the ports 34 and 29 closed.

The valve nozzle 30 is provided on its upper face with a shoulder 37 which, when said valve is in its main position, abuts against a stop plate 38 removably secured as by the screw 39, to the beveled outer wall of said head 27, the said plate serving to limit the outward movement of the valve. By removing the stop plate 38 the valve 33 may be readily removed.

The valve nozzle 30 is preferably carried on the end of a pipe 40 adapted to be clamped by screws to the oscillating carrier 41 pivoted at its upper end by the screw 42 to the frame upright 8. Said carrier 41 is provided between its ends with an opening 43 through which extends the screw 44 eccentrically mounted in the end of said shaft 13. Mounted upon the screw 44 is a slide block 45 (see Figs. 2 and 4) adapted to slide between the two flanges 46, upon said carrier 41, whereby rotation of said shaft 13 will impart an oscillatory motion to the arm 41 and to the valve nozzle 30 thereon. The rear or delivery end of the nozzle is flattened as best shown in Figs. 6 and 7, the better to enable it to travel in the channel or like groove in the sole or article to be wetted. The leading edge of the flattened nozzle is full as shown at 37ª, Fig. 6, while the following edge is preferably shortened as at 37ᵇ.

At a suitable point within the rservoir, preferably near the bottom thereof, as herein, is pivoted a lever 47, and to the ears 48 thereon, is in turn pivoted the stem 49 of a valve 50 controlling the supply pipe 51 for the reservoir. Said lever 47 is provided with a float 52, by means of which movement of the valve stem 49 and the supply of water to the reservoir is regulated automatically, the lever 47 dropping and withdrawing the valve stem 49 from its seat when the water level in the reservoir falls.

Communicating with and near the top of the reservoir is a valve device 53, the lower end of which is tapped to receive the upper end of the by-pass pipe 54 which, at its lower end, communicates with the passage 24 referred to. The valve device 53 is provided with a seat 55 and valve 56, the stem of which is guided in a plug 57 adjustably secured in the upper end of the valve casing. A spring 58 surrounding the valve stem tends normally to keep the valve seated, the pressure of the spring 58 and consequently the resistance imposed to the unseating of the valve being regulated by adjustment of said plug 57.

At a convenient point (see Fig. 1) and herein adjacent the valve 50, a heating pipe 59 is connected with the reservoir and provided with the valve 60 by means of which live steam or hot water may be admitted to the reservoir if desired. The reservoir may also be provided with a cover 62.

The operation of my machine is as follows:—The reservoir being supplied with water the valve 26 is opened and power is supplied by means of the connections described. The operator grasping the work, for example, a shoe sole, in his hand, inserts the nose of the nozzle 30 into the channel and close against the base of the lip. By pressing the work laterally, to the right (Fig. 2), the nozzle is forced back into the head 27 to cause the opening 34 to register with the passage 29, thereby to permit water to flow past the valve to the work. By releasing the pressure upon the nozzle 30 the latter at once moves to cut off the flow of water. The oscillation or vibration of the arm 41 being in the direction of the length of the channel assists in feeding the work, and the shape of the nozzle (Figs. 6 and 7) assists this action inasmuch as the rounded side 37ª of the outer wall of the valve 30 permits it to slide smoothly along the channel and against the work when moving in one direction, e. g. away from the operator, while the sharp corners of the beveled face 37ᵇ of the valve in contact with the work when the arm 41 is moving toward the operator, have a tendency to cause the work also to be moved along with the valve. The water is forced to and through the nozzle by the worm 21 and whenever the water is supplied by said worm faster than is required for use at the nozzle 30, or whenever the pipe 25 or valve 33 become choked or the flow otherwise retarded, the surplus water is returned to the reservoir by means of the by-pass 54 and valve device 53, the pressure of the water causing the valve 56 to be released. The valve 30 by its position in the channel serves as a convenient guide for the operator in feeding the work.

Mounted on the column (Fig. 1) is a trough 65, to catch any liquid that may drip from the work or the nozzle 30.

Claims:

1. In a work moistening machine, a source of liquid supply, means to feed the liquid to the work, automatic means to regulate the flow of liquid and an intermittently operable liquid feeding guide for the work.

2. In a work moistening machine, a source of liquid supply, automatic means to positively feed the liquid to the work, automatic means to regulate the flow of liquid and an oscillating intermittently operable liquid feeding guide for the work.

3. In a work moistening machine, a source of liquid supply, means to feed the liquid to the work, automatic means to regulate the flow of liquid and an adjustable oscillating guide for the work.

4. In a work moistening machine, a source of liquid supply, automatic means to regulate the supply of liquid thereto, means to feed the liquid to the work, an adjustable automatic means to apply said liquid adapted to assist in feeding the work to the liquid applying means, and means to impart oscillatory motion to said liquid applying means.

5. In a work moistening machine, a source of liquid supply, automatic means to regulate the supply of liquid thereto comprising a valve lever, a stem movably connected thereto and means for automatically actuating said stem, means to supply a heating medium for said liquid, means to feed the liquid to the work, an adjustable automatic means to apply said liquid adapted to assist in feeding the work to the liquid applying means, and means to impart oscillatory motion to said liquid applying means.

6. In a work moistening machine, a source of liquid supply, automatic means comprising a gravity actuated valve stem, to regulate the supply of liquid thereto, means to supply a heating medium for said liquid, said means permitting intimate mingling of said liquid and heating medium, means to feed the liquid to the work, means to feed surplus liquid back to the source of supply, an adjustable automatic means to apply said liquid adapted to assist in feeding the work to the liquid applying means, and means to impart oscillatory motion to said liquid applying means.

7. In a work moistening machine, a combined guide and oscillating work feed nozzle, a source of liquid supply therefor, and heating means for said liquid.

8. In a work moistening machine the combination of a receptacle for liquid supply, automatic means to supply the liquid to said receptacle, a substantially horizontal nozzle adapted to be rocked in a vertical plane about a support between said rocking means and said receptacle for liquid supply, means to force the liquid from said receptacle to said nozzle and an automatically controlled by-pass for said feeding means.

9. A work moistening machine comprising, in combination, a source of liquid supply, a work feeding nozzle adapted to apply liquid between the faces of the work, means to impart to and fro movement thereto and a flexible connection between said nozzle and said source of supply.

10. A work moistening machine comprising, in combination, a source of liquid supply, a work feeding delivery nozzle connected therewith, said delivery nozzle having a flattened end, one edge of which is curved while the opposite edge is inclined.

11. A work moistening machine comprising in combination a source of liquid supply, a delivery nozzle connected therewith and constructed at its end to assist in feeding the work in one direction, and means to impart to and fro movement to said nozzle.

12. A work moistening machine comprising in combination a source of liquid supply, a work guiding, feeding, delivery nozzle communicating therewith, means dependent upon operative contact of the work with said nozzle to admit liquid to the work and means to regulate the supply of liquid admitted by such means.

13. A work moistening machine comprising in combination, a reservoir, a work feeding nozzle connected therewith, an auxiliary support for said nozzle in which the latter is movably mounted, and liquid supply devices controlled by the relative movement between said nozzle and its said support.

14. A work moistening machine comprising in combination a reservoir for the liquid supply, automatic means to regulate the maintenance of said supply, a support for said reservoir provided with a chamber connected with said reservoir, liquid feeding means in said chamber, a nozzle carrier movably secured to said frame, a shaft mounted in said frame and eccentrically connected to said carrier to oscillate the same, and a wetting head connected to said chamber and reservoir, and comprising an oscillating nozzle adapted to be reciprocated, to establish communication between the same and said reservoir.

15. A work moistening machine comprising in combination, a reservoir for the liquid supply, automatic means to regulate the maintenance of said supply, a support for said reservoir provided with a chamber connected with said reservoir, liquid feeding means in said chamber, a nozzle carrier movably secured to said frame, a shaft mounted in said frame and eccentrically connected to said carrier to oscillate the same, and a wetting head connected to said chamber and reservoir comprising an oscillating nozzle with a segmental wedge shaped nose adapted to assist in feeding the work, a valve within said nozzle, said nozzle adapted to be reciprocated to establish communication between the same and said reservoir.

16. In a work moistening machine, the combination with the reservoir 10, the valve 50 to control the supply thereto, valve 53 to control the by-pass thereto, wetting head 27 provided with the nozzle 30, feeding member 21 to feed the liquid from said reservoir to said head, wetting head carrier 41, oscillating means therefor comprising the stud 42, carrier oscillating shaft 13 and pin 44 connecting said carrier to said shaft.

17. In a work moistening machine a source of liquid supply, means for forcing the liquid to the work, automatic means to regulate the flow of liquid and a guide for the work through which the liquid flows, said guide being movable by pressure of the work to start said flow.

18. In a work moistening machine a source of liquid supply, a liquid feeding guide for the work connected with said supply, means for forcing liquid from said supply to said guide, and means for oscillating said guide.

In testimony whereof, I have signed my name to this specification, in the presence of two subscribing witnesses.

CHARLES P. STANBON.

Witnesses:
 EVERETT S. EMERY,
 ROBERT H. KAMMLER.